Sept. 13, 1949. G. C. JONES 2,481,755
RADIATOR CLAMP
Filed Aug. 6, 1947 2 Sheets-Sheet 1
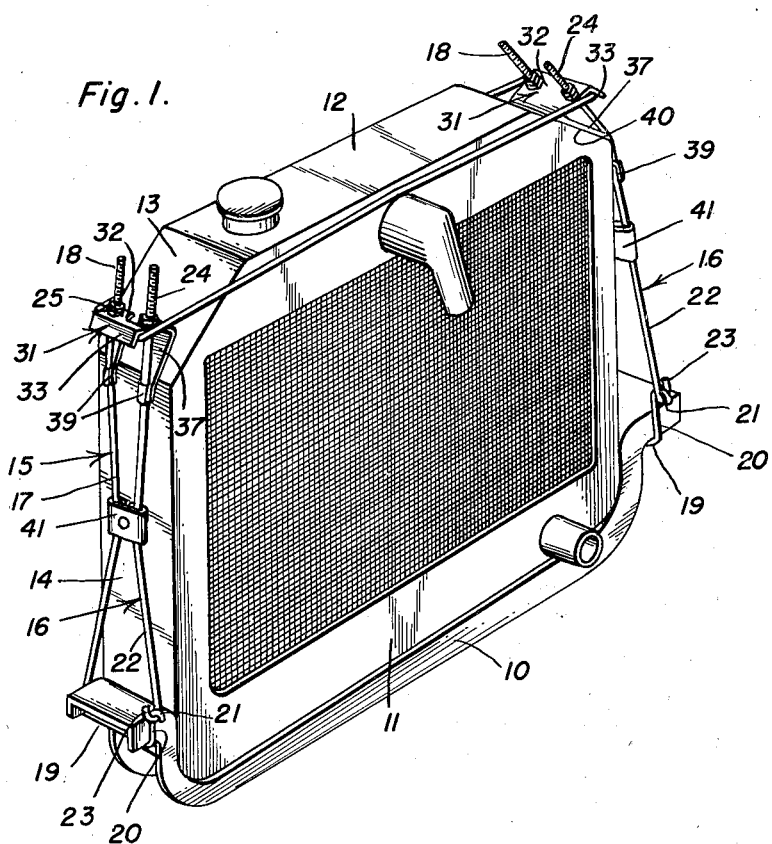
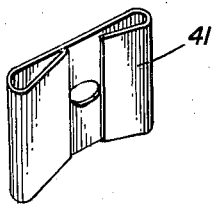
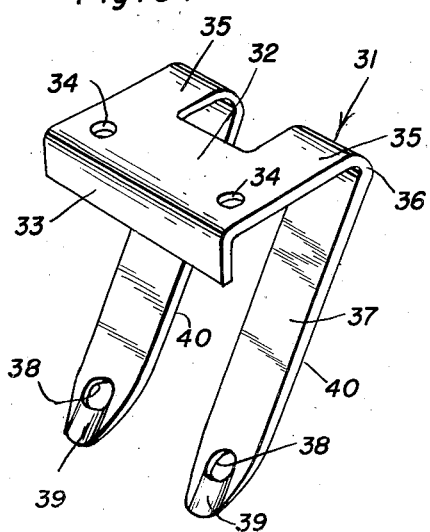
Inventor
Gilbert C. Jones
By *Clarence A. O'Brien and Harvey B. Jacobson*
Attorneys Sept. 13, 1949.     G. C. JONES     2,481,755
RADIATOR CLAMP
Filed Aug. 6, 1947     2 Sheets-Sheet 2
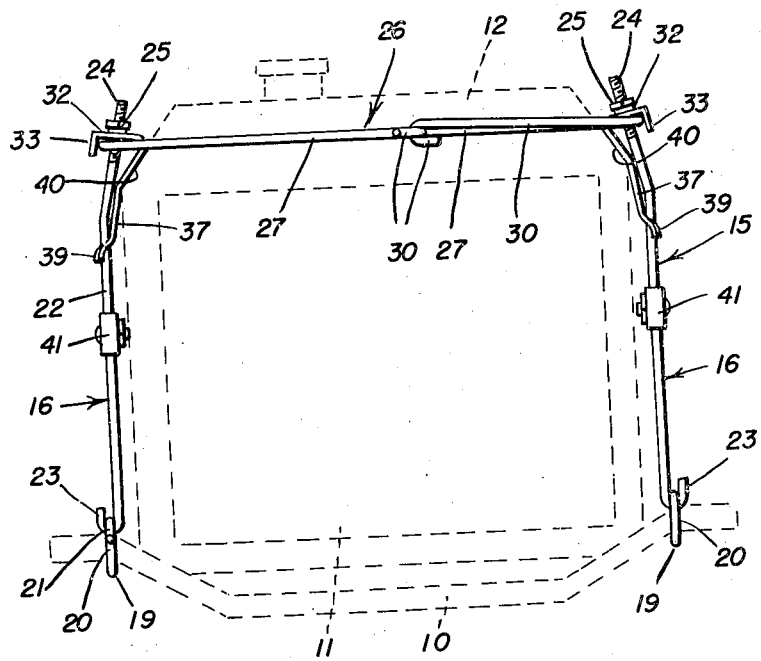
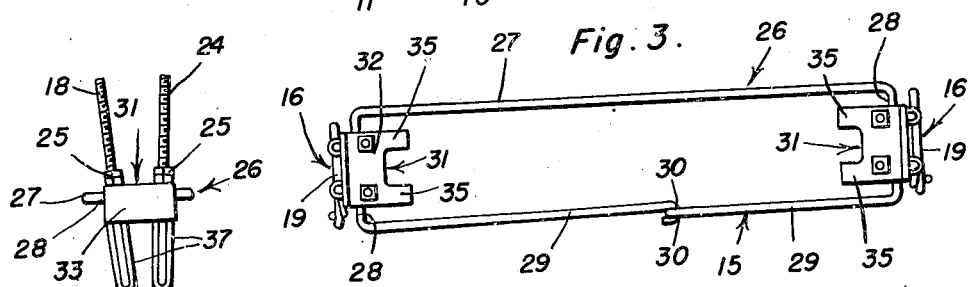
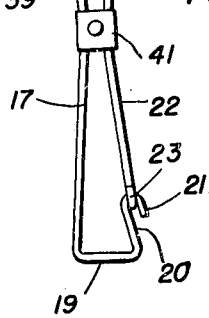
Inventor
Gilbert C. Jones
By *Clarence A. O'Brien and Harvey B. Jacobson*
Attorneys Patented Sept. 13, 1949

2,481,755

UNITED STATES PATENT OFFICE 2,481,755

RADIATOR CLAMP

Gilbert C. Jones, La Grange, N. C.

Application August 6, 1947, Serial No. 766,725

3 Claims. (Cl. 248—361)

This invention relates to a radiator clamp and has for its primary object to support and anchor a radiator to the chassis of a motor driven vehicle.

Another object is to satisfactorily support a radiator on a vehicle when the anchoring elements usually employed become broken or otherwise defective.

A further object is to facilitate the attaching of the clamp to the chassis and to the radiator without requiring the removal of the radiator from its position on the chassis of the vehicle.

The above and other objects may be attained by employing this invention which embodies among its features a pair of yokes adapted to be attached to the chassis of a vehicle adjacent opposite sides of the radiator thereof and to extend upwardly along the sides of the radiator to a point near its upper end, a loop adapted to embrace the upper end of the radiator and the upper ends of the yokes, saddles slidably mounted on the yokes adjacent their upper ends for engaging the radiator on opposite sides adjacent its upper end and means to exert downward pressure on the clamps to bind the radiator in place.

Other features include angularly extending faces on the saddles so that as pressure is exerted on them to move them downwardly, pressure will be exerted on opposite upper corners of the radiator both inwardly and downwardly, securely to hold the lower end of the radiator on the chassis.

Still other features include means joining opposite ends of the loop to facilitate its proper positioning on the radiator, flanges on the saddles to embrace opposite ends of the loop so as to cause it to move downwardly with the saddles and guide openings in the saddles for receiving opposite legs of the yokes.

In the drawings:

Figure 1 is a perspective view of a portion of a chassis and radiator seated therein, showing this improved clamp in use;

Figure 2 is a rear end view of the clamp illustrating the radiator and chassis in broken lines;

Figure 3 is a plan view of the clamp illustrated in Figure 2;

Figure 4 is an end view of the clamp;

Figure 5 is a perspective view of a detail; and,

Figure 6 is a perspective view of one of the saddle members.

Referring to the drawings in detail a vehicle chassis is equipped with a conventional cross member 10 forming a support for a radiator 11 of conventional form having a tank 12, opposite sides 13 of which converge toward the upper end of the tank. The convergent sides of the tank join the sides 14 of the radiator which extend vertically as will be readily understood upon reference to the drawings.

My improved clamp designated generally 15 comprises a pair of yoke members each designated generally 16, and each yoke member comprises a leg 17 provided at its upper end with external screw threads 18 and at its lower end with a transversely extending arm 19 which terminates in spaced relation to the leg 17 in an upturned extension 20 carrying a hook 21 at its upper extremity.

Extending upwardly in spaced relation to the leg 17 is a leg 22, the lower end of which is provided with a hook member 23 for engagement with the hook 21, while the upper end of the leg 22 is externally screw threaded as at 24. The upper ends of the legs terminate in substantially the same horizontal plane and are adapted to cooperate with adjusting nuts 25 which are threaded thereon in a conventional manner. As illustrated, there are two such yoke members and these are adapted to extend upwardly adjacent opposite sides of the radiator from a point near the bottom thereof to its upper end.

A loop designated generally 26 is adapted to surround the upper end of the radiator and comprises a side bar 27 provided at opposite ends with end bars 28 each of which is formed with an extension 29 which lies substantially parallel to the side bar 27 and is provided at its end with a hook 30 which as illustrated in the drawings are adapted to interlock to form in effect a continuous loop which surrounds the upper end of the radiator. When the loop is in place it also embraces the upper ends of the legs of the yokes 16 in order to hold the yokes against spreading.

Mounted for vertical sliding movement at the upper end of each yoke 16 is a saddle member designated generally 31. Each saddle member comprises a plate 32 provided along one longitudinal edge with a downturned flange 33 and having formed adjacent opposite ends openings 34 for the reception of the upper ends of the legs 17 and 22 of the yokes 16. Projecting from the edge of the plate 32 opposite the downturned flange 33 and adjacent each end of the plate are arms 35 which are bent downwardly as at 36 to form downwardly and outwardly inclined legs 37, the lower ends of which are apertured as at 38 and struck outwardly as at 39 to form guide openings for the reception of the legs 17 and 22 of the yokes 16. The inclined shape of the legs 37 form cam surfaces 40 which as illustrated in the drawings, bear against the junctions of the side walls 13 of the tank and the side walls 14 of the radiator.

A suitable clip 41 may be mounted on each yoke to embrace the legs 17 and 21 thereof as will be readily understood upon reference to the drawings.

In use, when it is desired to anchor a radiator to the chassis of a vehicle, the hooks 21 and 23 are disengaged from one another so that the cross bars 19 of the yokes 16 may be passed beneath the cross member 10 of the chassis of the vehicle, thus to serve as a bottom anchor for the yokes. The hooks 21 and 23 are then reengaged and the yokes extended upwardly to lie along opposite sides of the radiator 11. The loop 26 is then placed in embracing position about the upper end of the radiator, and its opposite ends are engaged beneath the depending flanges 33 of the saddle members 31, while the upper ends of the arms 17 and 22 are thrust through the openings 38 and 34 of the saddle members 31 after which the nuts 25 are threaded onto the threaded ends 18 and 24 of the legs 17 and 22 of the yokes 16. Upon tightening the nuts 25 against the plates 32 of the saddle members 31 it will be obvious that the loop 26 will be moved downwardly and at the same time the cam faces 40 of the saddle members 31 will exert inward and downward pressure on the upper corners of the radiator firmly to hold it in position on the cross member 10. The clips 41 may be adjusted to any desired position on the arms 17 and 22, and if so desired a bolt may be passed through the opening in each clip to be anchored to any suitable fixed support on the chassis.

It will thus be seen that a radiator which may have become loose or from which the anchorage may have been broken may easily and quickly be firmly secured in place on the chassis of a vehicle without requiring that it be completely dismantled, as its secure anchorage can be effected by employing the clamp herein described.

While in the foregoing there has been shown and described the preferred embodiment of this invention it is to be understood that minor changes in the details of construction, combination and arrangement of parts may be resorted to without departing from the spirit and scope of the invention as claimed.

Having thus described the invention, what is claimed as new is:

1. A radiator clamp comprising a loop adapted to embrace the upper end of a radiator, a saddle member coupled to each end of the loop and adapted to engage the radiator adjacent each upper corner, an anchoring yoke on each side of the radiator having one end engaged with a fixed member and the other end passed through an adjacent saddle and means on the yokes to engage the saddles and force them downwardly against the radiator.

2. A radiator clamp comprising a pair of separable anchoring yokes adapted to engage a fixed member and to extend upwardly along opposite sides of a radiator, a loop adapted to embrace the upper end of the radiator and the upper ends of the yokes and saddles at the junctions of the loop and the yokes for bearing on the radiator and exerting a downward and inward pressure thereon.

3. A clamp for holding a radiator on the cross member of a vehicle chassis, said clamp comprising a pair of U-shaped yokes detachably connected at their lower ends to the cross member of the chassis on opposite sides of the radiator, a loop embracing the upper end of the radiator and the upper ends of the yokes, saddles slidable vertically on the upper ends of the legs of the yokes and engaging the radiator, adjustable means on the yokes for engaging the saddles to hold them in engagement with the upper corners of the radiator and hooks on the saddles for engaging opposite ends of the loop to hold it in radiator embracing position and the yokes against spreading.

GILBERT C. JONES.

REFERENCES CITED

The following references are of record in the file of this patent:

UNITED STATES PATENTS

| Number | Name | Date |
|---|---|---|
| 1,077,197 | Hewitt | Oct. 28, 1913 |